June 3, 1941.  E. H. BARDER ET AL  2,244,481

INNER TUBE

Filed July 25, 1935

Inventors
Earl H. Barder
Clarence E. Snyder
By Eakin & Avery
Attys

Patented June 3, 1941

2,244,481

UNITED STATES PATENT OFFICE 2,244,481

INNER TUBE

Earl H. Barder and Clarence E. Snyder, Akron, Ohio, assignors to The B. F. Goodrich Company, New York, N. Y., a corporation of New York Application July 25, 1935, Serial No. 33,120

9 Claims. (Cl. 152—330)

This invention relates to inner tubes.

Because of the high speeds of automobiles of the present time and also because of structural characteristics of the wheel and spring assemblies and the steering mechanism it has become important that the wheel and tire assembly be balanced in order that the oscillation of the assembly commonly called "shimmying," and other evils of unbalanced centrifugal force, may be avoided.

Various expedients, such as the addition or subtraction of material to or from the rim or other part of the wheel structure at an appropriate position circumferentially thereof have been employed, but they have involved a relatively large expense and have required the balancing of the wheel after the tire and inner tube have been mounted thereon.

The chief objects of our invention are to provide for conveniently and economically producing a condition of balance in the assembly; to avoid the unsightly appearance and the risk of loss of external counterweights; and to avoid the necessity of changing or adding to or subtracting from the metal parts of the assembly.

We accomplish these objects by employing the inner tube of the tire as a counterbalancing means, which places the counterweight at a greater distance from the axis of the wheel and consequently at a more effective position than that of any counterbalancing means applied directly to the wheel itself, and in fact in the preferred form of our invention the counterbalancing means is located in the tread region of the inner tube, which, in the tubes of larger cross-section now generally employed, gives a very high degree of effectiveness to a counterbalancing means of given weight as compared with means of the same weight applied directly to the wheel.

Figure 1:
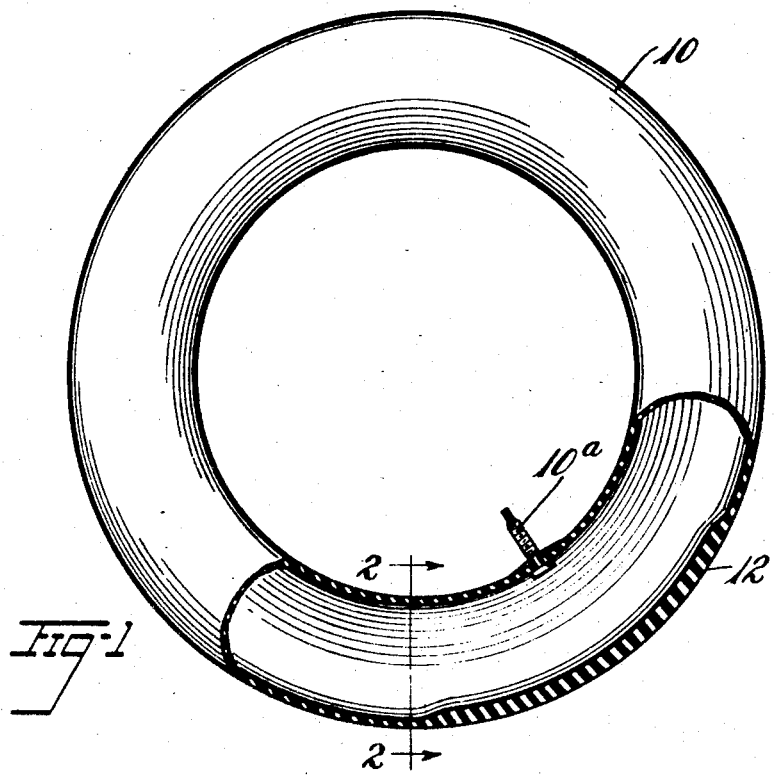
Fig. 1 is a side elevation, with a portion sectioned and broken away, of an inner tube embodying and made in accordance with our invention in its preferred form.
Figure 2:
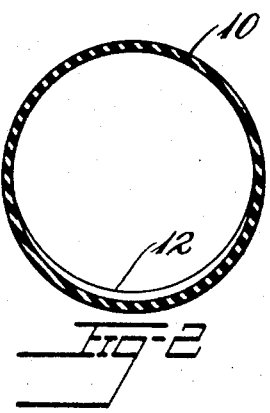
Fig. 2 is a section on line 2—2 of Fig. 1.

Referring first to the preferred embodiment of our invention shown in Fig. 1, the inner tube, 10, is formed in its tread portion, in the region of the valve stem 10$^a$ longitudinally of the tube, with a relatively thick wall 12, which by the amount and position of the added rubber composition serves as counterbalancing means, the tube preferably being vulcanized in a mold under internal fluid pressure so that its exterior surface is without visible evidence of the relatively thick wall portion.

In order that all of the relatively thick wall portion may be homogeneous and integral with respect to the rest of the body of the tube, and in order that the tube may be formed economically, it preferably is formed by extrusion, with apparatus such as is shown and described in Waner Patent No. 2,044,961 of June 23, 1936, a continuous tubular strip of the rubber composition suitable to be cut into individual lengths for a succession of the tubes being extruded and cut as stated in said patent and the valve stem 10$^a$ being mounted in place and the ends of each length being spliced together, after which the endless tube is placed in the mold and vulcanized under internal fluid pressure.

The apparatus of said patent comprises an extruding machine provided with a special head adapted to form a continuous tubular strip of the rubber composition with a succession of the relatively thick wall portions 12 at spaced intervals along the strip.

It is preferred to form the tube with a relatively thick wall zone only in outer or tread portion where the moment of the zone is greatest, and this is of a thickness to produce the weight desired in the relatively thick, counterbalancing zone of the tube.

The continuous tube preferably is subsequently severed into lengths at such positions that the valve stem can conveniently be mounted in the wall of each length at a position cross-sectionally opposite to the relatively thick zone, and before or after the valve stem is so mounted the ends of the length are spliced together and the resulting endless tube is vulcanized in a mold under internal fluid pressure or in any other known or preferred way.

The above stated object is thus conveniently and economically attained.

When the tube 10 of Fig. 1 has been completed and vulcanized it is of course heavier at one side than the other by reason of the presence of the valve stem 10$^a$ as well as because of the relatively thick wall portion 12 and it is mounted in the tire casing with that side at the lightest part of the casing, which can be ascertained by methods that are obvious or already well known. It is found that the off-balance of the general run of casings is sufficiently uniform that by the use of successive tubes having substantially the same construction a close approximation of balance can be obtained in a succession of the tire and tube assemblies.

It is feasible also to employ off-balance of the tube in conjunction with off-balance of the casing for counteracting any off-balance that may exist in the wheel itself.

Figure 3:
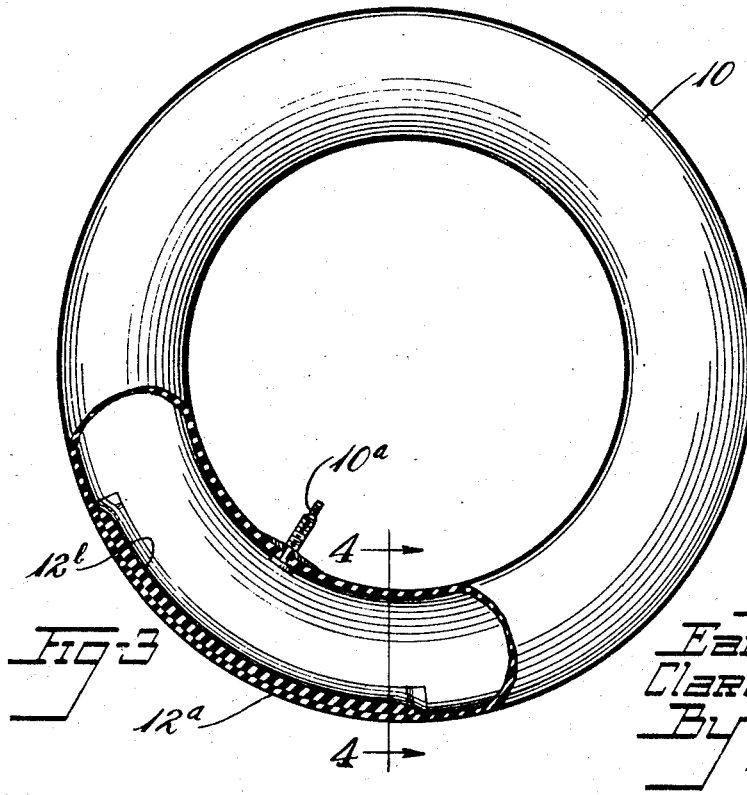
Fig. 3 is a view corresponding to Fig. 1 but illustrating a modified form of the invention.
Figure 4:
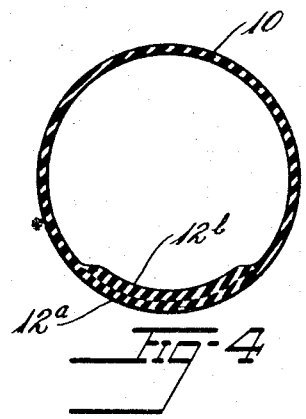
Fig. 4 is a cross-section on line 4—4 of Fig. 3.

In the modification shown in Figs. 3 and 4 the tube is of the type that is made of calendering the rubber composition in flat sheet form, cutting it into strips, longitudinally seaming the strips to provide a continuous tubular strip, cutting the strip into individual tube-lengths and then completing the tubes as above described.

In this embodiment the relatively thick wall portion, 12ª, is provided by adhering to the flat calendered strip at proper positions, by the use of rubber cement or other adhesive, or by utilizing the adhesiveness of freshly calendered rubber, a piece of sheeted stock 12ᵇ of the proper weight for counterbalancing, which becomes more firmly united with the contacted wall of the tube during vulcanization.

We claim:

1. A pneumatic tire and wheel assembly comprising a wheel and tire casing having an off-balance condition, and an inner tube mounted therein and provided in a portion only of its length radially outward of the rim zone of the tube with weighting means additional to its inflating means in amount and location in the tube such as to provide a substantially balanced assembly.

2. A pneumatic tire and wheel assembly comprising a wheel and tire casing having an off-balance condition, and an inner tube mounted therein provided with a locally thickened wall portion radially outward of the rim zone of the tube of such weight and location as to provide a substantially balanced assembly.

3. A pneumatic tire and wheel assembly comprising a wheel and tire casing having an off-balance condition, and an inner tube mounted therein and provided in a portion only of its length in the tread region only of the tube with weighting means additional to its inflating means in amount and location in the tube such as to provide a substantially balanced assembly.

4. A pneumatic tire and wheel assembly comprising a wheel and tire casing having an off-balance condition, and an inner tube mounted therein provided with a locally thickened wall portion in the tread region only of the tube of such weight and location as to provide a substantially balanced assembly.

5. A pneumatic tire and wheel assembly comprising a wheel and tire casing having an off-balance condition, and an inner tube mounted therein provided with a locally thickened wall portion in the tread region only of the tube of integral rubber composition throughout the thickness of such weight and location as to provide a substantially balanced assembly.

6. A wheel balancer comprising a rubber pad incorporated with an inner tube, said pad having a weight and being located so as substantially to offset unbalance of the wheel assembly in which said tube is used.

7. Balancing means for a wheel, tire casing and inner tube assembly comprising an inner tube having in the tread region only of the tube a locally thickened wall portion of rubber material integral and homogeneous throughout the thickness of said portion, providing off-balance weight in the inner tube for counterbalancing off-balance in the assembly.

8. A substantially balanced tire casing and inner tube assembly comprising a tire casing and an inner tube therein having in the tread region only of the tube a locally thickened wall portion of rubber material integral and homogeneous throughout the thickness of said portion, providing off-balance weight in the inner tube and being so located with respect to off-balance weight in the casing and inner tube assembly as substantially to counterbalance the off-balance weight in the assembly.

9. A wheel balancer comprising an inner tube having incorporated therein a locally thickened wall portion in a part only of its length radially outward of the rim zone of the tube, said thickened wall portion being integral and homogeneous throughout the thickness of said portion and having a weight and being located so as substantially to offset unbalance of the wheel assembly in which the tube is used.

EARL H. BARDER.
CLARENCE E. SNYDER.

DISCLAIMER 2,244,481.—*Earl H. Barder* and *Clarence E. Snyder*, Akron, Ohio. INNER TUBE. Patent dated June 3, 1941. Disclaimer filed July 10, 1941, by the assignee, *The B. F. Goodrich Company.*

Hereby disclaims from the scope of claim 6 of said Letters Patent all wheel balancers except those in which the pad for the purpose specified is incorporated with the inner tube prior to vulcanization of the inner tube.

[*Official Gazette August 5, 1941.*]